US006459086B1

(12) United States Patent
Kline et al.

(10) Patent No.: US 6,459,086 B1
(45) Date of Patent: Oct. 1, 2002

(54) DIGITAL PEAK DETECTOR FOR RADIATION DETECTION SYSTEMS

(75) Inventors: Barry D. Kline, Cleveland Hts; Jerome J. Griesmer, Kirtland, both of OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/722,131

(22) Filed: Nov. 24, 2000

(51) Int. Cl.[7] .................................................. G01T 1/24
(52) U.S. Cl. ............................ 250/370.13; 250/370.01; 250/370.09
(58) Field of Search ..................... 250/370.01, 370.13, 250/370.09

(56) References Cited

U.S. PATENT DOCUMENTS

| | | | |
|---|---|---|---|
| 4,090,080 A | | 5/1978 | Tosswill |
| 4,262,207 A | | 4/1981 | Tosswill |
| 4,982,096 A | | 1/1991 | Fujii |
| 5,077,770 A | | 12/1991 | Sammon |
| 5,821,533 A | * | 10/1998 | Bingham et al. ...... 250/370.01 |
| 5,967,983 A | | 10/1999 | Ashburn |
| 5,991,357 A | | 11/1999 | Marcovici |
| 6,046,454 A | | 4/2000 | Lingren et al. |
| 6,055,450 A | | 4/2000 | Ashburn |
| 6,091,070 A | | 7/2000 | Lingren et al. |

OTHER PUBLICATIONS

G.L. Zeng, et al. "Eigen Analysis of Cone–Beam Scanning Geometries." *Three–Dimensional Image Reconstruction in Radiation and Nuclear Medicine*© 1996 by Kluwer Academic Publishers, Netherlands. pp. 75–86.

G.L. Zeng, et al., "A cone beam tomography algorithm for orthogonal circle–and–line orbit." *Phys. Med. Biol.*, 1992, vol. 37, No. 3, 563–577.

S.Webb, et al., "Monte Carlo modeling of the performance of a rotating circle–slit–collimator for improved planar gamma–camara imaging," *Phys. Med. Biol.*, vol. 37, No. 5, 1095–1108, 1992.

Mauderli, et al., "A Computerized Rotating Laminar Radionuclide Camera." *J. Nucl. Med.* 20:341–344 (1979).

Entine, et al., "Cadmium Telluride Gamma Camera," *IEEE Transactions on Phys.* vol. NS–26, No. 1:552–558 (1979).

Urie, et al., "Rotating Laminar Emission Camera with GE–detector," *Med. Phys.* 8(6) :865–870 (1981).

Mauderli, et al., "Rotating Laminar Emission Camera with GE–detector," *Med. Phys.* 8(6) :861–876 (1981).

Malm, et al., "A Germanium Laminar Emission Camera," *IEEE Transactions on Nuclear Science*, vol. NS–29, No. 1:465–468m (1982).

Mauderli, et al., "Rotating Laminar Emission Camera with GE–Detector: Further Developments," *Med. Phys.* 14(6) :1027–1031 (1987).

* cited by examiner

*Primary Examiner*—Constantine Hannaher
*Assistant Examiner*—Andrew Israel
(74) *Attorney, Agent, or Firm*—Fay, Sharpe, Fagan, Minnich & McKee, LLP (57) ABSTRACT

A subject (10) is disposed adjacent a detector array (18) of a nuclear camera. The subject (10) is injected with a radioactive isotope (14) and γ-ray emissions indicative of nuclear decay are detected at the detector array (18). Individual detectors (22) are monitored in groups of 64. When one of them detects a nuclear event, it produces an electrical spike that is filtered into a Gaussian with about a 1.2 μsec peaking time. A 10 bit analog to digital converter (44) 10 repeatedly digitizes the amplitude of the Gaussian pulse, e.g. at a 20 MHz clock rate. The 10 bit digitized pulse amplitudes are monitored by a 10 bit comparitor (46), which monitors consecutive values of the digitized signal, looking for the peak value, e.g. for the amplitude to stop rising. When the peak is detected, the most recent four digital pulse amplitudes contiguous to the peak are summed in a 12 bit accumulator (106) to generate a 12 bit peak amplitude value. A series of 12-bit peak values and the corresponding pixel addresses are stored in a buffer memory of the event analyzer (42). A reconstruction processor (46) reconstructs the identifications of the γ-ray receiving detectors, or other indicators of event detection location, and the digital peak values to generate an image representation.

19 Claims, 8 Drawing Sheets

DIGITAL PEAK DETECTOR FOR RADIATION DETECTION SYSTEMS

BACKGROUND OF THE INVENTION

The present invention deals with the radiation detection arts. It finds particular application in conjunction with electronics used in nuclear cameras and will be described with particular reference thereto. However, it is to be appreciated that it is not limited to the aforementioned application.

Heretofore, nuclear imaging has employed a source of radioactivity to image the anatomy of a subject. Typically, a radiopharmaceutical is injected into the patient. This radiopharmaceutical contains atoms that decay at a predictable rate. Each time an atom decays, it releases a γ-ray. These γ-rays are detected, and from information such as their detected position and energy, a representation of the interior of the subject is reconstructed.

Typically, a nuclear camera has one, two, or three detector heads. Each head has a large scintillator sheet, such as doped sodium iodide, which converts incident radiation photons into scintillations, i.e. flashes of light. An array of photomultiplier tubes is disposed in back of the scintillator to monitor for light flashes. The output of the photomultiplier tubes and associated circuitry indicates the coordinates of each scintillation on the sodium iodide crystal and its energy. Unfortunately, there are numerous non-uniformities and inaccuracies when using a large scintillator crystal and an array of photomultiplier tubes.

This type of detector is only capable of processing one nuclear event at a time. Γ-rays incident upon the detector temporally too close together are typically ignored. The reset time is determined in part by the afterglow of the crystals, and to a lesser extent, the processing time of the electronics.

Rather than using a single, large scintillator and photomultiplier tubes, others have proposed using an array of small scintillators, each associated with a photodiode or other photoelectrical device which senses a scintillation in each individual scintillation crystal. Other types of individual solid-state detectors have also been suggested.

Previously, the most common means of processing data from solid state detectors has been to detect the peak voltage of an analog pulse which results from integrating the released charge and shaping the resulting waveform. Typically, such a peak detection system will use a non-linear analog circuit which follows an input voltage only as long as it is monotonically increasing. Such a peak detecting circuit is usually followed by a high resolution (12 bits) analog to digital converter (ADC) to provide digital data suitable for reconstruction. The ADC is commanded to begin conversion at some point following the beginning of the pulse, providing enough time for the analog peak detector to have operated. Subsequent to the ADC conversion time, the peak detector must be reset before it is ready to accept another pulse. The sum of the time to peak (~1 μsec), the ADC conversion time (~1–5 μsec), and the reset time (~500 ns including analog voltage settling time) creates a "dead time" in which the system cannot respond to a new pulse.

Further, these analog systems are not trivially constructed. That is, they are not made using easily attainable parts. The amplifiers required to provide quick action in controlling the non-liner elements and provide high accuracy at these speed typically use high power supply currents. High accuracy ADCs are expensive, slow, and relatively power consumptive.

The present invention provides a new and improved method and apparatus that overcomes the above referenced problems and others.

SUMMARY OF THE INVENTION

In accordance with one aspect of the present invention, a nuclear imaging apparatus is given. An array of solid state detectors emits current spikes in response to incumbent γ-irradiation. The current spike is spread into a Gaussian pulse, and an amplitude is detected of the pulse. A reconstruction processor reconstructs an image from the energy and location of the current spikes.

According to another aspect of the present invention, a method of nuclear imaging is given. Radiation events are detected with an array of solid state detectors, generating current spikes in response to the radiation. The spikes are spread into pulses. A peak amplitude is detected of each of the pulses. An image is reconstructed from peak amplitude information representing event energies, and address information, representing event location.

According to a more limited aspect of the present invention, a timeout feature resets detector circuitry to avoid system lockup.

One of the advantages of the present invention is that it decreases the effective event processing time of the system.

Another advantage is that it provides a detector much smaller than present detectors.

Another advantage is that it creates very little dead time when the detector cannot process new data.

Another advantage is that it requires very low supply voltages and currents to operate.

Another advantage is that count rates are improved.

Yet another advantage of the present invention is that it provides a detector that is more easy to maintain than present detectors.

Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
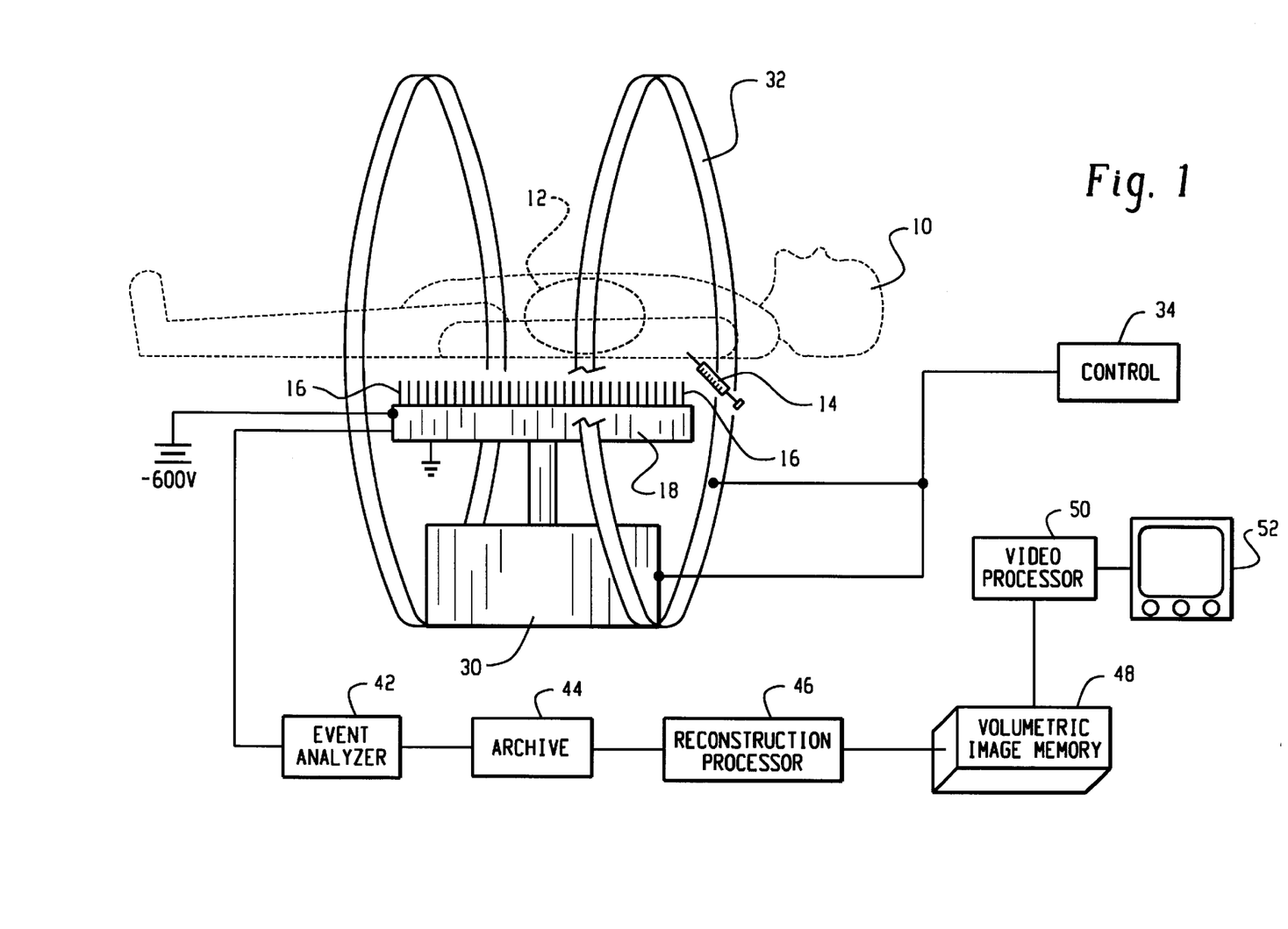
FIG. 1 is a diagrammatic illustration of a nuclear imaging device in accordance with the present invention.

With reference to FIG. 1, a region of interest of a subject 10 is disposed in an imaging region 12. In the preferred embodiment, a radiopharmaceutical 14 is injected into the subject, near a region to be imaged. For example, if a physician wanted to view a blockage in the aorta, the isotope would be injected into the bloodstream upstream from the blockage. As another example, the radiopharmaceutical is injected into the circulatory system and its selective absorption by tissue of interest is monitored.

As quantum physics predicts, atomic nuclei of the radioactive isotope decay over time. Energy is released at the time of decay in the form of a radiation photon, more specifically, a γ-ray of characteristic energy.

Many of the γ-rays produced during an imaging process are lost, propagating in useless directions. However, some of the γ-rays pass through collimators 16, thin tungsten or other high-z vanes in the preferred embodiment, and strike a detector array 18. In the preferred embodiment and with reference to FIGS. 2, 3, and 5, the detector array 18 includes a 4×24 array of cadmium zinc telluride (CZT) crystal arrays 20, each having 4×8 individual detectors 22. In the preferred CZT embodiment, a potential difference of ×600 V applied across the detector arrays by a power supply 24. More specifically to the preferred embodiment, a bias grid 26 is disposed on top of the detector array that applies the preferred voltage bias. When a γ-ray strikes the detector, it frees many electrons from their bonds to the detector material. These electrons are propelled by the bias voltage to form an electrical signal on an output electrode 28.

In the preferred embodiments, the solid state detector array 18 and collimators 16 are mounted on a mechanized drive 30 that moves the detector array. Preferably, the array moves with lateral rotational components of motion, although various trajectories are contemplated. In some applications, the detector array is stationarily mounted within a movable gantry that is indexed circumferentially around the region of interest.

In the preferred embodiment, the support is mounted on a rotatable gantry 32 which extends fully around the subject 10. A motor control 34 selects a range of motion of the detector array 18, if any, within the rotatable gantry and rotation of the gantry 32 stepwise or continuously around the image region.

In SPECT imaging, the collimator 16 limits access to the detector array 18 to radiation following prescribed paths or trajectories, e.g., trajectories perpendicular to the plane of the detector array 18. In this manner, each radiation event defines a trajectory along which a radioisotope decayed. If the movable gantry 32 remains stationary, the detectors define a projection image of the radioisotope distribution in the region of interest. An event analyzer 42 determines the location which each events strikes the detector array, i.e., which detector receives it and the amount of energy of the radiation event. The radiation events collected at each stationary position of the detector array are stored in an archive or other buffer memory 44. As the rotatable gantry 32 is rotated to different angular positions around the subject, a plurality of projection images from different angular orientations are collected. A reconstruction processor 46 back-projects or otherwise reconstructs the data from the archive memory 44 into a volumetric image representation for storage in a volumetric image memory 48. A video processor 50 under operator control selectively withdraws portions of the volumetric image representation and converts them into appropriate form for display on a video, active matrix, or other human-readable monitor 52.

Figure 2:
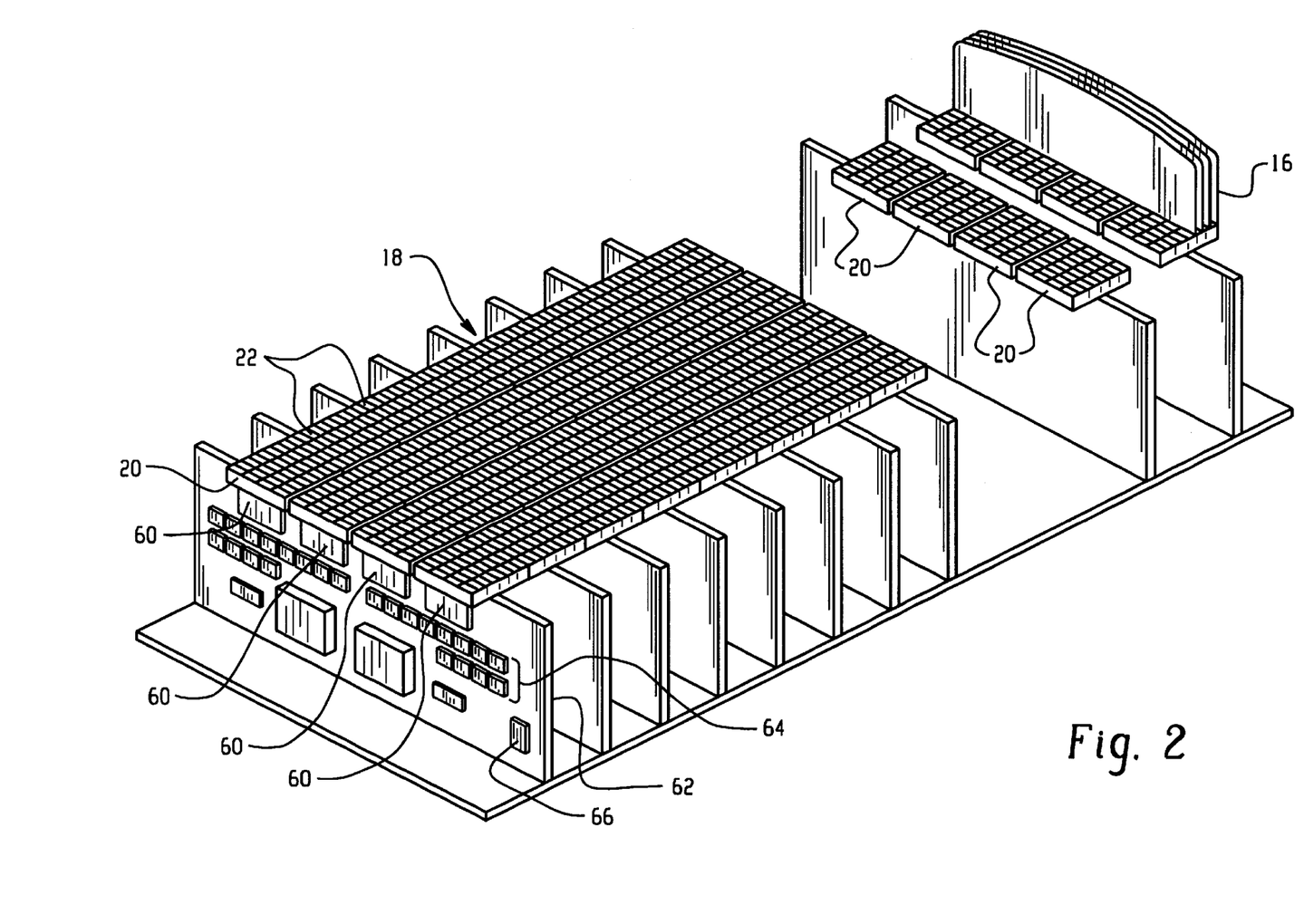
FIG. 2 is a perspective view of the detector array.
Figure 3:
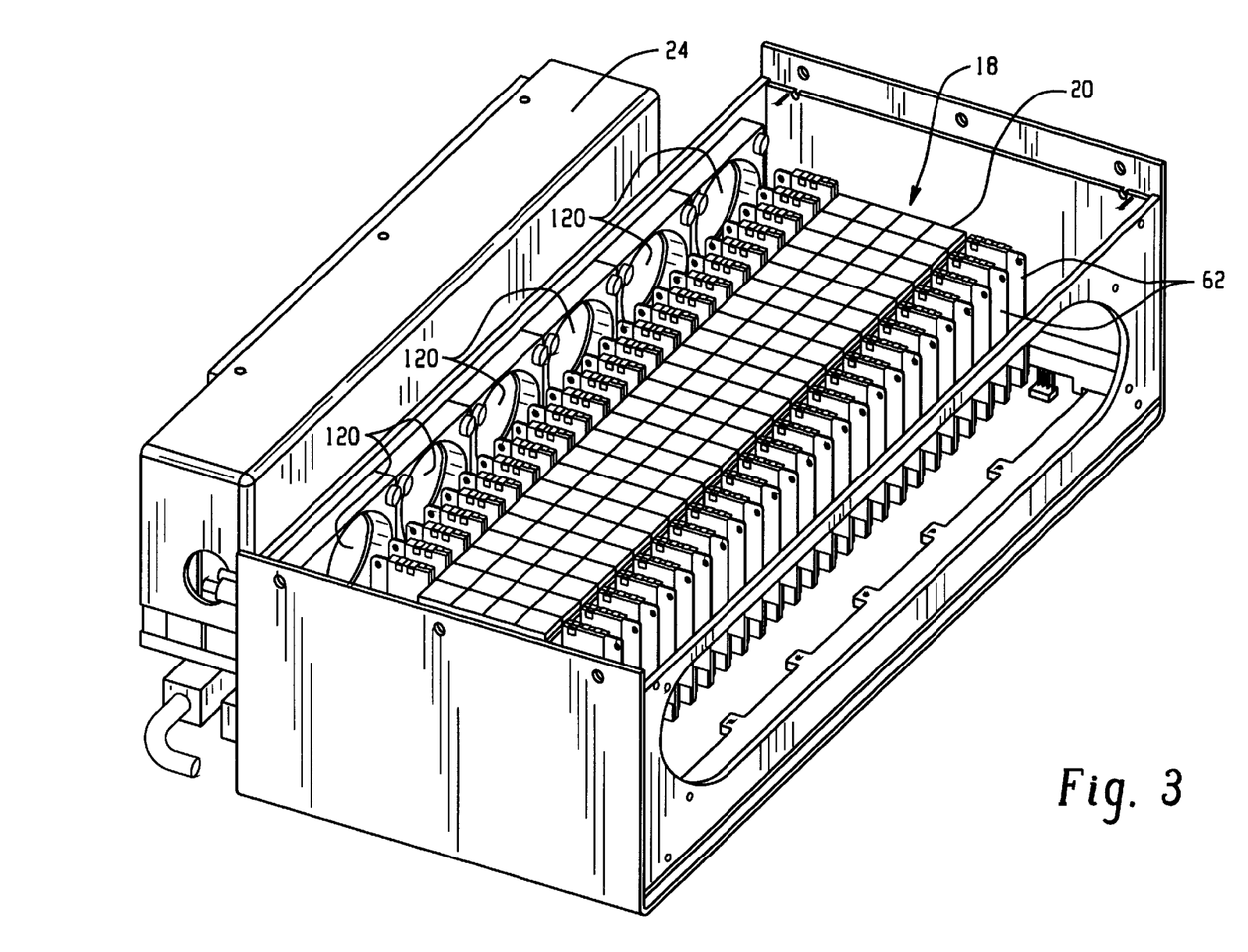
FIG. 3 is a perspective view of the detector array, circuit boards, and cooling fans.

With reference to FIG. 3 and continuing reference to FIGS. 1 and 2, received γ-rays are detected and their energy measured by electronics attached to the detector array 18. Each time a γ-ray strikes one of the detectors, it releases electrons producing an output electrical pulse. Preamplifiers 60 and associated electronics 64 mounted on circuit boards 62 amplify the low level output pulses, spread the pulse, measure the area under the pulse, convert the area to a analog output, trigger on signals exceeding a threshold, and multiplex the analog voltage into a digitizer and digital peak detector, which sends a series of measurements to portions of the event analyzer 42 mounted remotely.

Figure 4:
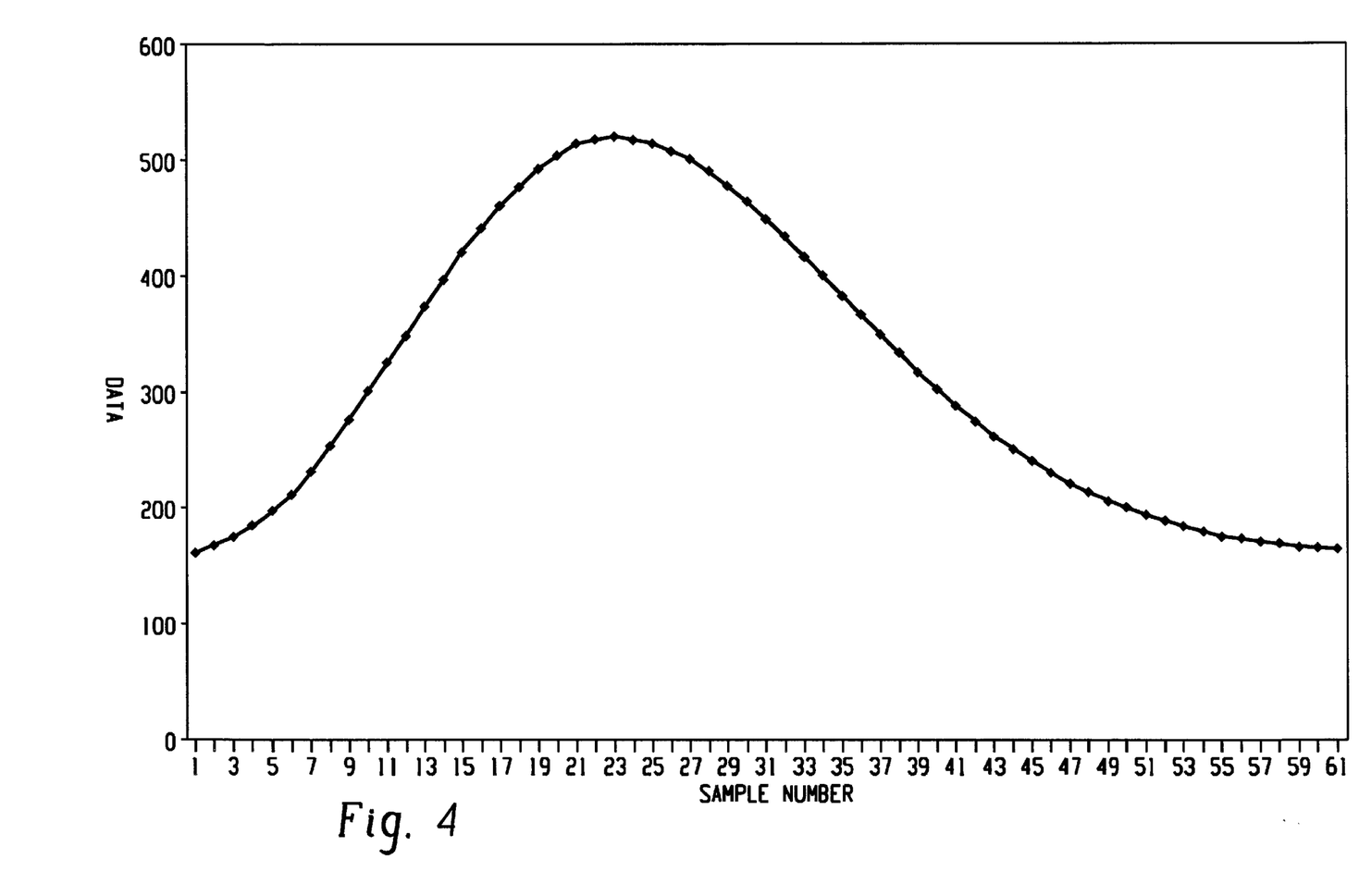
FIG. 4 is a digitized Gaussian pulse, in accordance with the present invention.

More specifically, the shape of the output pulses represents the classic δ-function, that is, infinite height, infinitesimal width, but a finite area. In order to obtain a more processable signal, the spike is spread into a Gaussian curve with substantially the same area, but with a measurable height. Preferably, the spike is filtered with a high order low-pass filter and is stretched to a duration of about 3 μsec. This Gaussian is digitized, preferably at 20 MHZ, as illustrated in FIG. 4.

Figure 5:
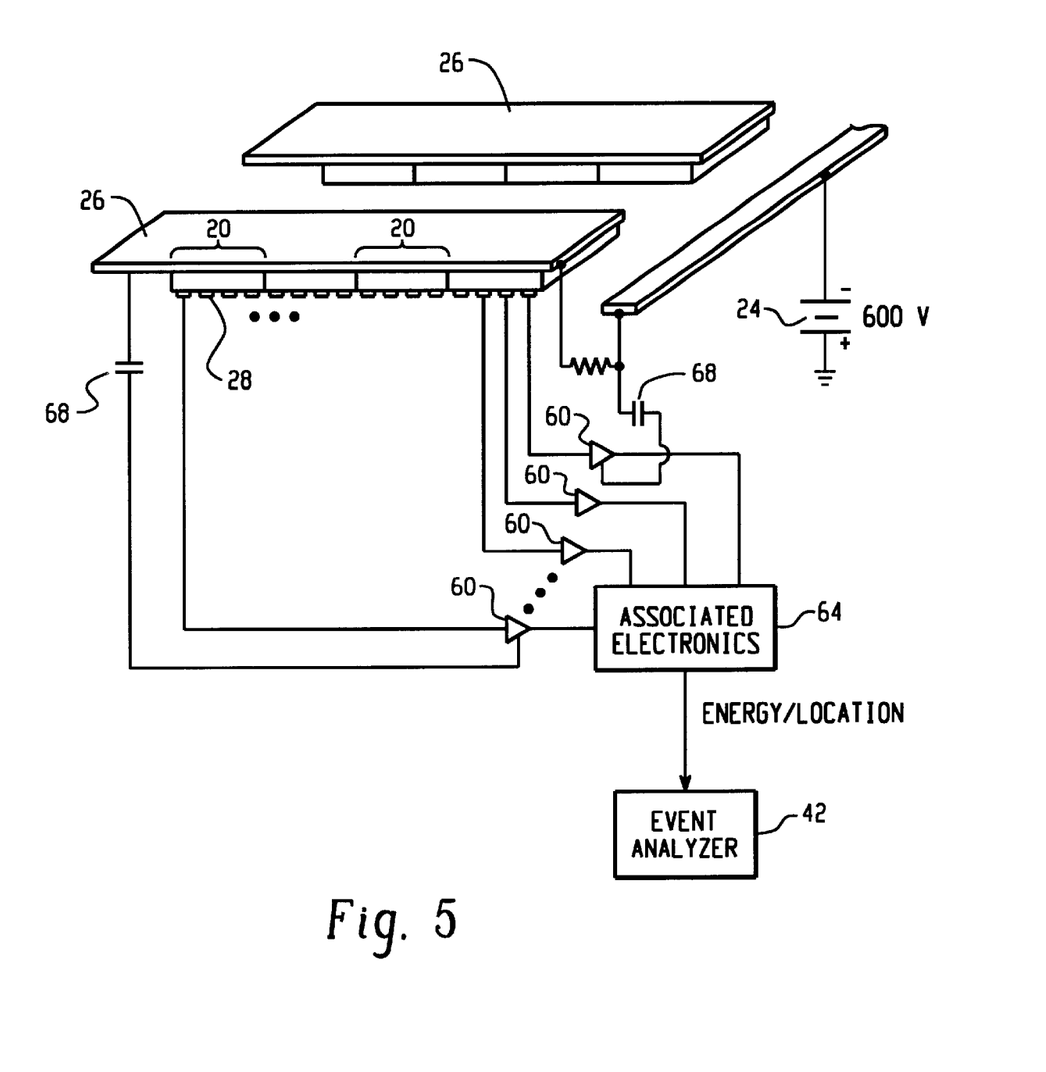
FIG. 5 is an expanded view of the detector assembly and circuit components.

With reference to FIG. 5, preamplifiers 60 amplify and stretch these spikes into pulses, the area under which is more easily measured by the downstream circuitry 64. For high speed detection, short pulses are advantageous. For accurate measurement of the area under the pulse, longer durations are preferred. In the preferred embodiment, a duration of about three microseconds is preferred.

At the time of the pulse, a digital peak detection system 70 of the preferred embodiment "wakes up," that is, becomes active from an idle state in response to a leading edge trigger 200 of the pulse. The system then monitors the signal and verifies multiple monotonically increasing samples of the digitized input pulse. The system waits until the incoming data stream stops rising, indicating that a peak has occurred. It then produces an effectively higher resolution result by adding several samples around the peak, and in the following clock cycle, resets itself, ready to process a new pulse.

Figure 6:
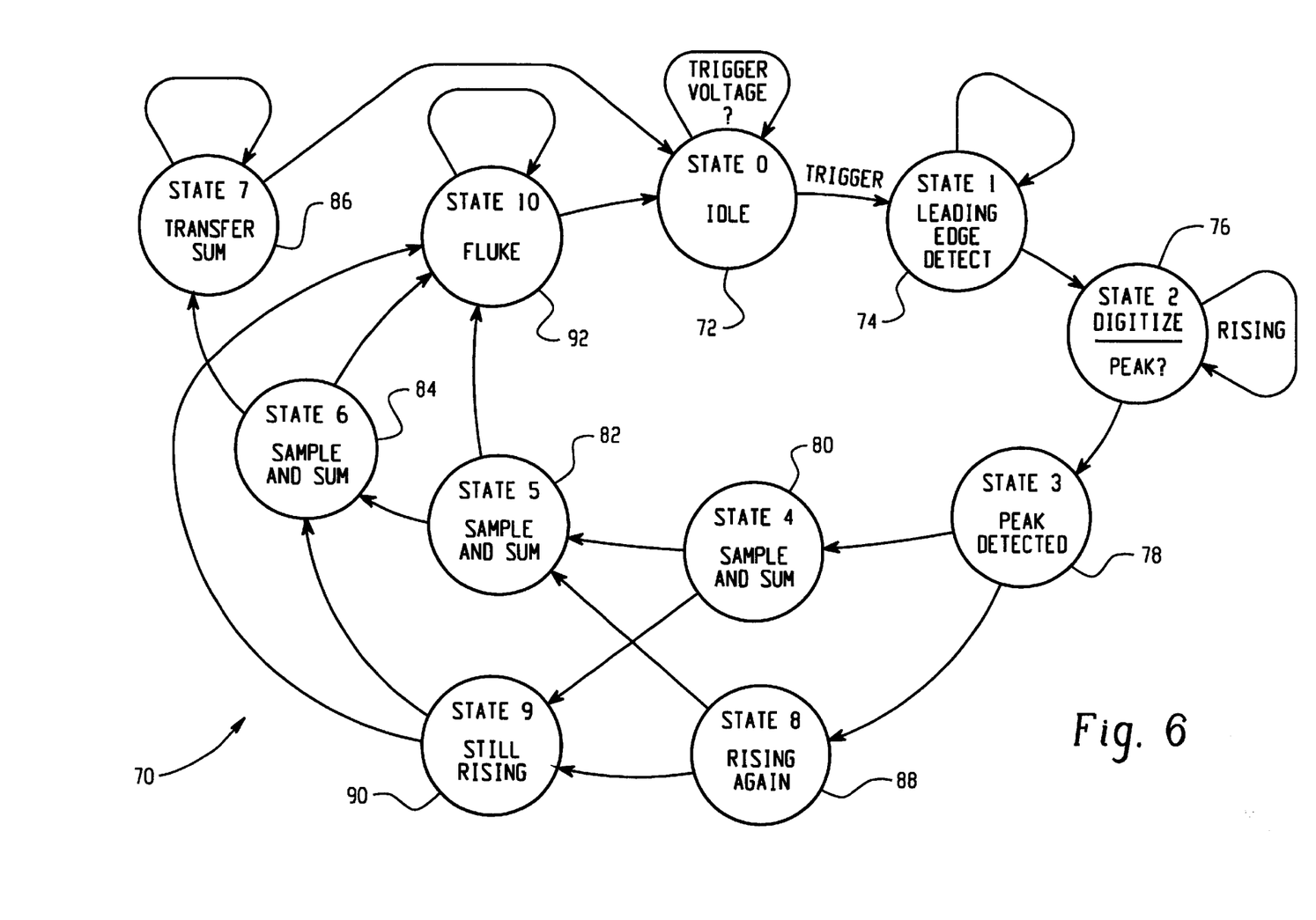
FIG. 6 is a flow diagram of a single event cycle.

The process just outlined is illustrated in FIG. 6, and will be described herein with greater detail. The system starts in a state 0 72 in which it is idle, waiting for a signal. Sensing a pre-determined threshold voltage brings the system out of idle. This makes the system less susceptible to ambient noise. Once the trigger of state 0 72 is true, meaning there is a signal present, the system moves to a state 1 74.

In state 1 74, the system is actively waiting for the signal to be passed through the filter and digitizer and awaits the leading edge of the signal. The system remains in state 1 74 until the digitized signal starts rising.

In a state 2 76, the system is waiting while the signal reaches its peak. It does this by comparing each portion of the signal to the one before, and if it is greater, the system remains in state 2 76. If the detected signal is less than a previous value of the signal, the system moves on to state 3 78, indicating the peak has been reached. State 2 76 has a timeout feature that will reset the system to state 0 72 if it does not find a peak within the expected time. If it takes longer to reach the peak than the time allotted, it most likely means that more than one event has occurred at the same detector, resulting in a rising edge much longer than expected. In this case, the system will reset without sending any data on.

Ideally, states 3,4,5,6, and 7, 78, 80, 82, 84, and 86 respectively, occur in consecutive clock cycles. If the signal behaves normally, then four consecutive values of the peak are recorded, (one in each of states 3, 4, 5, and 6, 78, 80, 82, 84) summed, and transferred out to the event archive 44 in state 7 86. After state 7 86 the cycle is complete, and the system returns to the idle state 0 72 and awaits the next event.

States 8, 9, and 10 88, 90, 92 occur only when unexpected data is present. If the signal rises after it has begun to fall, then the system waits for no more than two clock cycles (states 8 88 and 9 90) and if the data is not behaving as expected, the pulse is rejected in state 10 92, and the system returns to idle state 0 72 without transferring any data out to the event archive 44

Figure 7:
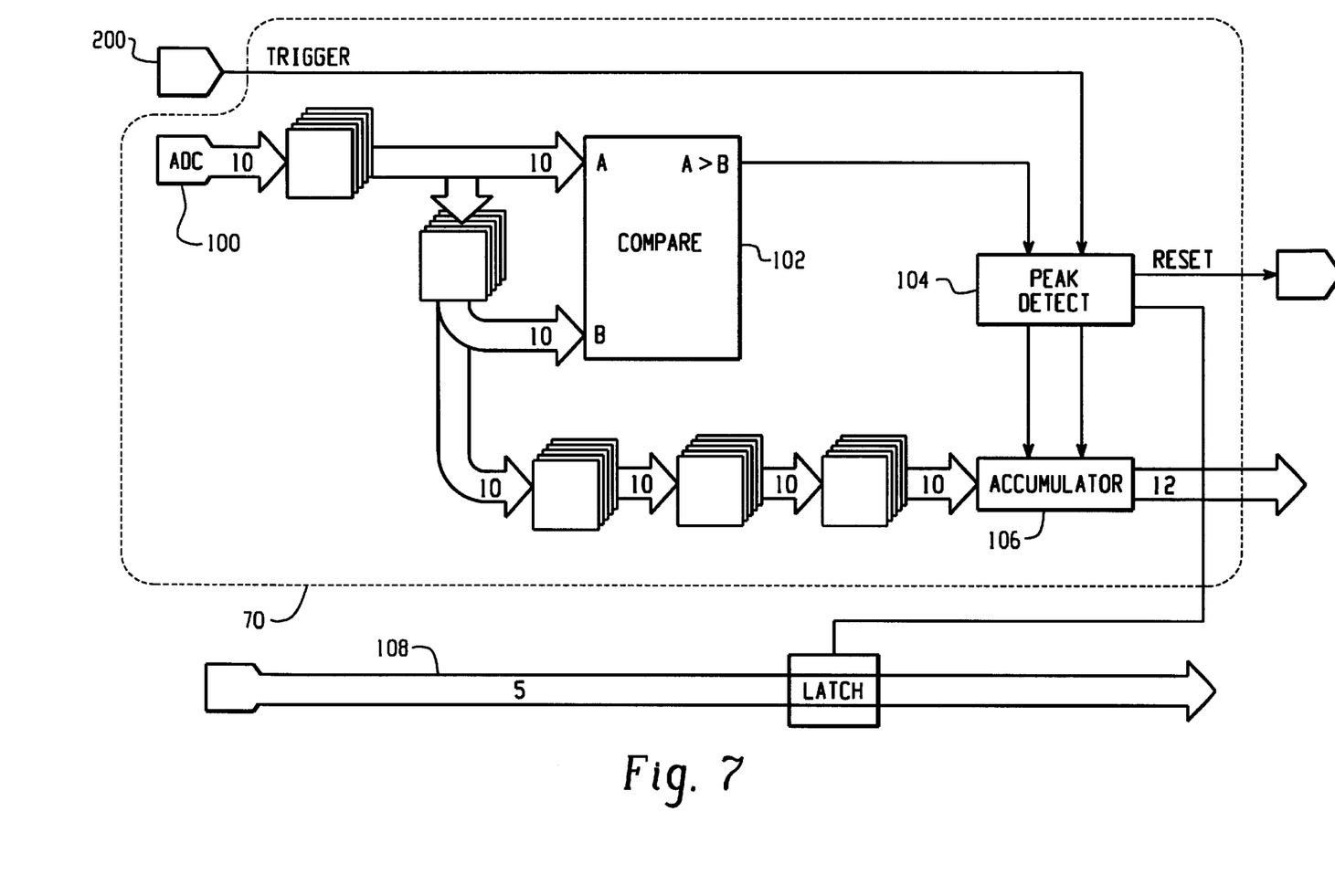
FIG. 7 is a flow diagram of a 10 to 12 bit conversion of data, in accordance with the present invention; and, FIG. 8 is a time diagram showing the relationship between different signals.

With reference to FIG. 7, data in from an ADC 100 is fed into A and B ports of a 10-bit magnitude comparator 102. When B>A, indicating the peak has been reached, a peak detector 104 triggers a 12-bit accumulator 106 to sum the next four digital samples effectively yielding the average of the four 10-bit signals into a higher resolution 12-bit value. A pixel address 108 accompanies the signal to identify the individual detector or indicator of the location at which the γ-ray corresponding to the sampled peak was received.

Figure 8:
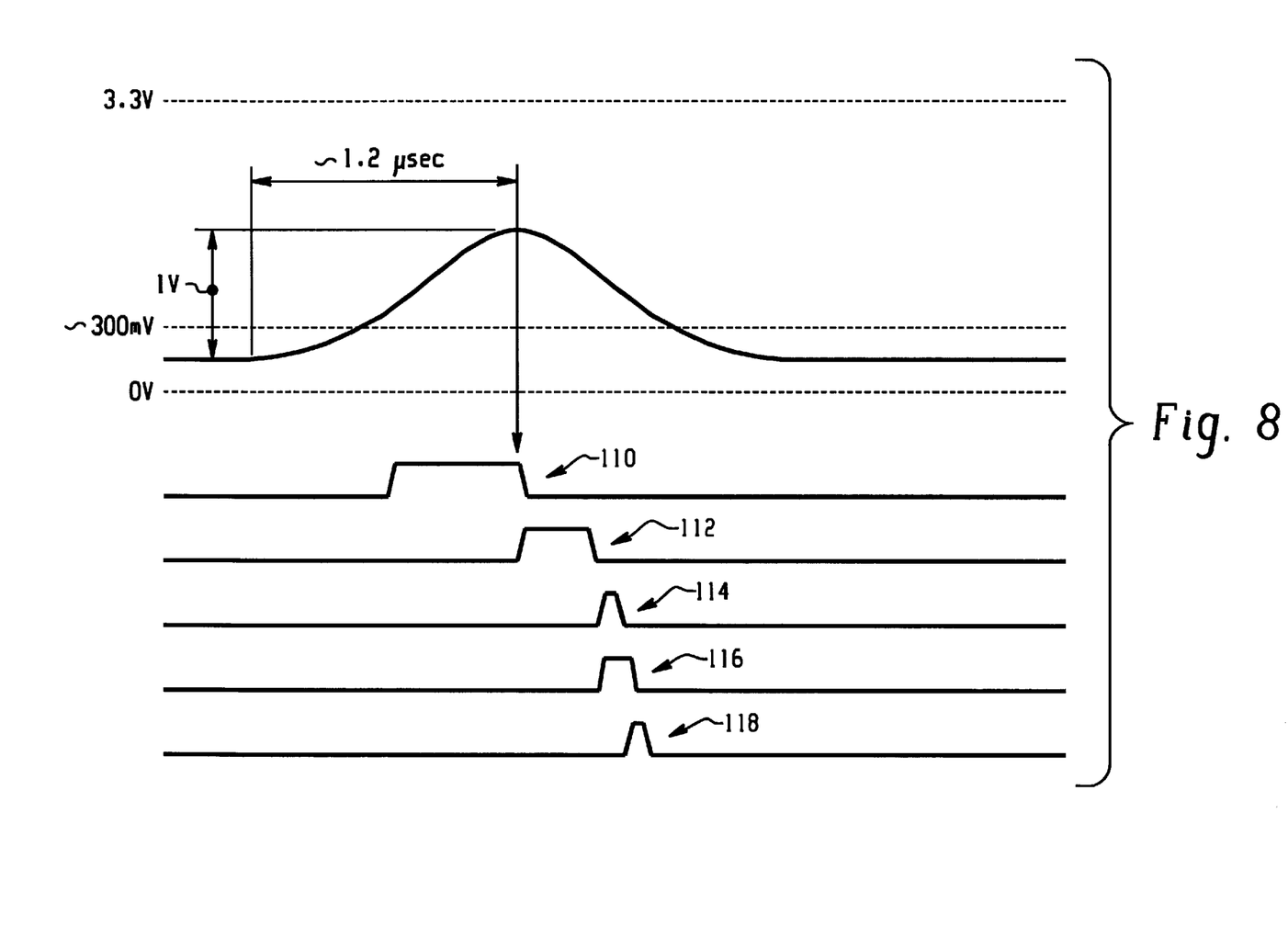

FIG. 8 illustrates an example of a signal that has been turned into a Gaussian and activity that ensues therefrom. The line 110 corresponds to state 2 76, after the threshold has triggered sampling but the detection system 70 is still waiting for a peak. The line 112 refers to the states when the peak has been sensed and four 10-bit digital values are sampled and summed. The line 114 is a reset signal sent that indicates that data collection is complete. The line refers to the time when state 7 86 is transferring the data to the event archive 44. The line 118 resets the system 70 to state 0 72.

In an alternate embodiment, the radioactive source is mounted and fixed on the opposite side of the subject across from the detector array. In this manner, the γ-rays which originate outside the subject either from a point or line source of radioactive material or a low power x-ray tube pass through the subject.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A nuclear imaging apparatus comprising:
    an array of solid state detectors which responds to incident γ-radiation events by emitting a current spike;
    a shaping circuit which spreads the spike into a Gaussian pulse;
    at least one analog to digital converter that repeatedly digitizes an amplitude of the Gaussian pulse to generate a series of digital pulse amplitudes;
    a digital peak detector which detects at least one of the digital amplitudes corresponding to a peak of the Gaussian pulse; and,
    a reconstruction processor which reconstructs an image representation from identifications of detector locations at which each of a plurality of the γ-radiation events of corresponding peak amplitudes are detected.

2. The nuclear imaging apparatus as set forth in claim 1, wherein the array of detectors is a multi-channel cadmium-zinc-telluride array.

3. The nuclear imaging apparatus as set forth in claim 1, further including:
    tungsten plates disposed parallel with respect to one another for collimating the γ-radiation incident on the detector array.

4. The nuclear imaging apparatus as set forth in claim 1, wherein the peak detector compares consecutive digital pulse amplitudes to find a maximum digital amplitude.

5. The nuclear imaging apparatus as set forth in claim 1, wherein the shaping circuit includes:
    a high order pulse shaping filter.

6. The nuclear imaging apparatus as set forth in claim 1, further including a plurality of event analyzers that determine event information including:
    a logical truth of a received radiation event;
    a location of the individual detector at a time it received the event; and,
    an energy of the received event.

7. A nuclear imaging apparatus comprising:
    an array of solid state detectors which responds to incident γ-radiation events by emitting a current spike;
    an event analyzer which determines a location at which each γ-radiation event is detected;
    a shaping circuit which spreads the spike into a Gaussian pulse;
    a peak detector which detects a peak amplitude of each pulse;
    at least one analog to digital converter that repeatedly digitizes the amplitude of the Gaussian pulse to generate a series of digital pulse amplitudes;
    an accumulator which holds a preselected number of consecutive digital pulse amplitudes and combines the held digital pulse amplitudes in response to the peak detector detecting the peak amplitude to generate a digital event energy value; and,
    a reconstruction processor which reconstructs an image representation from the detection locations of a plurality of the γ-radiation events with a corresponding energy.

8. The nuclear imaging apparatus as set forth in claim 7, wherein:
    the digital pulse amplitudes are 10 bits;
    the accumulator sums four digital pulse values such that the digital peak amplitude is 12 bits.

9. The nuclear imaging apparatus as set forth in claim 7, wherein the peak detector includes:
    a digital comparitor which compares each digital pulse value with a preceding digital pulse value.

10. A method of nuclear imaging comprising:
    detecting radiation events with an array of solid state detectors which generate a current spike in response to each radiation event;
    spreading each current spike into a pulse of characteristic shape;
    detecting for a peak amplitude of each pulse by repeatedly digitizing an amplitude of each pulse to generate a plurality of digital pulse amplitudes and comparing each digital pulse amplitude with a preceding digital pulse amplitude;
    reconstructing an image representation from locations at which radiation events were detected with corresponding peak amplitudes.

11. The method as set forth in claim 10, wherein the comparing step looks for the amplitude of the digital pulse amplitudes to start decreasing.

12. The method as set forth in claim 10, wherein the spreading step includes:
    applying a high order filter to the current spike.

13. The method as set forth in claim 12, wherein the pulse of characteristic shape is a Gaussian of 1.0–1.5 μsec peaking time.

14. A method of nuclear imaging comprising:

generating current spikes in response to each of a plurality of detected radiation events;

spreading each current spike into a pulse of characteristic shape;

repeatedly digitizing amplitudes of each pulse to generate a plurality of digital pulse amplitudes;

comparing the digital pulse amplitudes to determine when the digital pulse amplitudes start decreasing;

continuing to compare the digital pulse amplitudes after the amplitudes start decreasing;

in response to the digital pulse amplitudes starting to rise after the amplitudes start decreasing, discarding the corresponding detected radiation event.

15. The method as set forth in claim 14, further including:

timing a duration during which the compared digital pulse amplitudes continue to rise;

in response to the rising continuing for more than a preselected duration, discarding the corresponding detected radiation event.

16. A method of nuclear imaging comprising:

generating a current spike and a spatial location signal in response to each of a plurality of detected events;

spreading each current spike into a Gaussian pulse whose amplitude is indicative of an energy of the detected radiation event;

repeatedly digitizing amplitudes along each pulse to generate a series of digital pulse values;

temporarily storing a plurality of neighboring most recently digitized pulse values of the series;

detecting when the pulse values start to decrease;

increasing resolution of the energy of each detected radiation event by summing the plurality of neighboring digital pulse values to generate a higher resolution energy value;

generating an image from the location signals of the radiation events with a selected energy.

17. The method as set forth in claim 16, wherein the digital pulse values are 10 bits and four digital pulse values are summed such that the digital energy value is 12 bits.

18. A method of nuclear imaging comprising:

detecting a plurality of radiation events and generating a current spike and a detection location signal in response to each detected radiation event;

spreading each current spike into a pulse of characteristic shape;

detecting for a peak amplitude of each pulse by:
  detecting a leading edge of the pulse of characteristic shape;
  repeatedly digitizing the pulse to generate a series of pulse values;
  detecting when the pulse values have ceased rising;
  in response to the pulse values decreasing, sampling a plurality consecutive pulse values;
  summing the plurality of consecutive pulse values into one higher resolution value;
  accepting radiation events whose higher resolution values are within a preselected range;

reconstructing an image representation from the location signals of the accepted radiation events.

19. A nuclear imaging apparatus comprising:

an array of solid state detectors which responds to incident γ-radiation events by emitting a current spike;

a shaping circuit which shapes the spike into a Gaussian pulse;

an analog to digital converter that repeatedly digitizes an amplitude of the Gaussian pulse to generate a series of digital pulse values;

a peak detector that compares consecutive digital pulse values to find a maximum digital pulse value and compares consecutive pulse values following the maximum digital amplitude and rejects the radiation event in response to the digital pulse values increasing after the maximum digital amplitude.

* * * * *